United States Patent
Dadsetan et al.

(10) Patent No.: US 6,421,721 B1
(45) Date of Patent: Jul. 16, 2002

(54) CONTROLLING DEVICE ACCESS IN A NETWORK

(75) Inventors: Farzin Dadsetan, Valby; Tom Claus Goldermann Thuneby, Copenhagen, both of (DK)

(73) Assignee: International Business Machines Corporation,, Armonk, NY (US)

(*) Notice: Subject to any disclaimer, the term of this patent is extended or adjusted under 35 U.S.C. 154(b) by 0 days.

(21) Appl. No.: 09/268,895

(22) Filed: Mar. 16, 1999

(30) Foreign Application Priority Data

Jan. 5, 1999 (GB) .............................................. 9900067

(51) Int. Cl.[7] .......................................... G06F 15/173
(52) U.S. Cl. ...................... 709/224; 709/102; 709/104; 709/223
(58) Field of Search ................................. 709/224, 223, 709/233, 219, 102, 104, 315; 711/167; 707/9, 10; 710/36, 40

(56) References Cited

U.S. PATENT DOCUMENTS

| | | | | |
|---|---|---|---|---|
| 5,450,592 A | * | 9/1995 | McLeod | |
| 5,706,515 A | | 1/1998 | Connelly et al. | ........... 395/676 |
| 5,860,126 A | * | 1/1999 | Mittal | ........................ 711/167 |
| 5,951,653 A | * | 9/1999 | Hill et al. | |
| 6,055,577 A | * | 4/2000 | Lee et al. | .................... 709/233 |
| 6,076,105 A | * | 6/2000 | Wolff et al. | .................. 709/223 |
| 6,105,049 A | * | 8/2000 | Govindaraju et al. | |
| 6,105,050 A | * | 8/2000 | Govindaraju et al. | |
| 6,112,222 A | * | 8/2000 | Govindaraju et al. | |
| 6,154,741 A | * | 11/2000 | Feldman | ......................... 707/9 |
| 6,182,109 B1 | * | 1/2001 | Sharma et al. | |
| 6,279,054 B1 | * | 8/2001 | Boyle | .......................... 710/36 |

FOREIGN PATENT DOCUMENTS

GB      2296255      6/1996

* cited by examiner

Primary Examiner—David Wiley
Assistant Examiner—Oanh L. Duong
(74) Attorney, Agent, or Firm—A. Bruce Clay

(57) ABSTRACT

A client arbitrator operates in a multi-processing operating system for monitoring and controlling a client machine's access to one or more devices. The arbitrator includes a) a request monitoring thread instantiated by any process request to begin or to cease accessing a device, for updating a list of monitored processes accordingly; and b) a waiting thread monitoring termination of a monitored process. If a process terminates the waiting thread determines any locked devices to which the terminated process has access, and, responsive to no other monitored process having access to any of the locked devices releases the client machine's access to the devices.

14 Claims, 2 Drawing Sheets

CONTROLLING DEVICE ACCESS IN A NETWORK

FIELD OF THE INVENTION

The present invention relates to a method and component for monitoring and controlling access to a device in a network environment.

BACKGROUND OF THE INVENTION

In the present specification, machines to which devices are connected are referred to as device machines and machines requesting access to devices are known as client machines. For clarity the machines are shown separately, but it will be seen that when employing a multi-processing operating system like Windows NT from Microsoft Corporation, device and client software may in fact be running on the same computer and so logically the same computer may be acting as both a client and a device machine.

Referring now to FIG. 1, in a networked environment the attachment of client machines 10 to devices 12 across a network 22 needs to be managed. It is usual in such an environment for client machines to include an arbitrator 14 and for device machines 20 to include a server component 16 which determines which client machine is to obtain access to a device 12. Where a process 17–19 in the client machine needs exclusive access to a device, its arbitrator 14 causes the server component 16 to lock the device thus excluding other client machines from accessing the device.

The client arbitrator 14 in these excluded machines usually keeps retrying to access the device for a predetermined period before replying to a calling client process with a time out message. Once any calling client processes 17–19 in the original client machine are finished with a device, the associated client arbitrator 14 instructs the server component 16 in the device machine to release the lock on the device, thus allowing other client machines access.

It is known for server components to periodically check if a client machine who has locked a device is still operational or to be notified if a client machine terminates abnormally. A problem exists, however, in that the device machine cannot know the current status of client processes unless a high burden of monitoring these processes is placed on the device machine. It is therefore possible for a client process which has requested the client arbitrator to access and lock a device to terminate abnormally but for the client machine to continue to operate. In such a case, the device machine may never know that the client machine should have released the lock giving access to the device and so the device may continue to be locked for longer than necessary.

It is not acceptable in environments such as banking to require a client machine to be turned off simply because a single process has terminated abnormally, particularly if such a machine also acts as a device machine which could be servicing other clients.

Solutions to this problem are that the device machine simply disconnects the client machine if the client has had access to a device for more than a pre-determined period of time or if no activity has taken place for more than a pre-determined period. These are less than satisfactory solutions as the device remains locked for longer than necessary and the abrupt disconnection of the client may indeed be a reason for less than robust client processes failing.

DISCLOSURE OF THE INVENTION

It is therefore an object of the present invention to provide a method and component operable within such a network for mitigating the above problems.

Accordingly, the present invention provides as client arbitrator operable in a multi-processing operating system for monitoring and controlling a client machine's access to one or more devices, said arbitrator including: request monitoring means, responsive to a process request to begin or to cease accessing a device, for updating a list of monitored processes accordingly; and waiting means, responsive to termination of a monitored process, for determining any locked devices to which said process has access, and, responsive to no other monitored process having access to any of said locked devices, for releasing said client machine's access to said devices and a method operable in a client arbitrator operable in a client arbitrator for a multi-processing operating system for monitoring and controlling a client machine's access to one or more devices, said method comprising the steps of: responsive to a process request to begin or to cease accessing a device, updating a list of monitored processes accordingly; responsive to termination of a monitored process, determining any locked devices to which said process has access; and responsive to no other monitored process having access to any of said locked devices, releasing said client machine's access to said devices.

BRIEF DESCRIPTION OF THE DRAWINGS

An embodiment of the present invention will now be described with reference to the accompanying drawings, in which.

DESCRIPTION OF THE PREFERRED EMBODIMENTS

Figure 1:
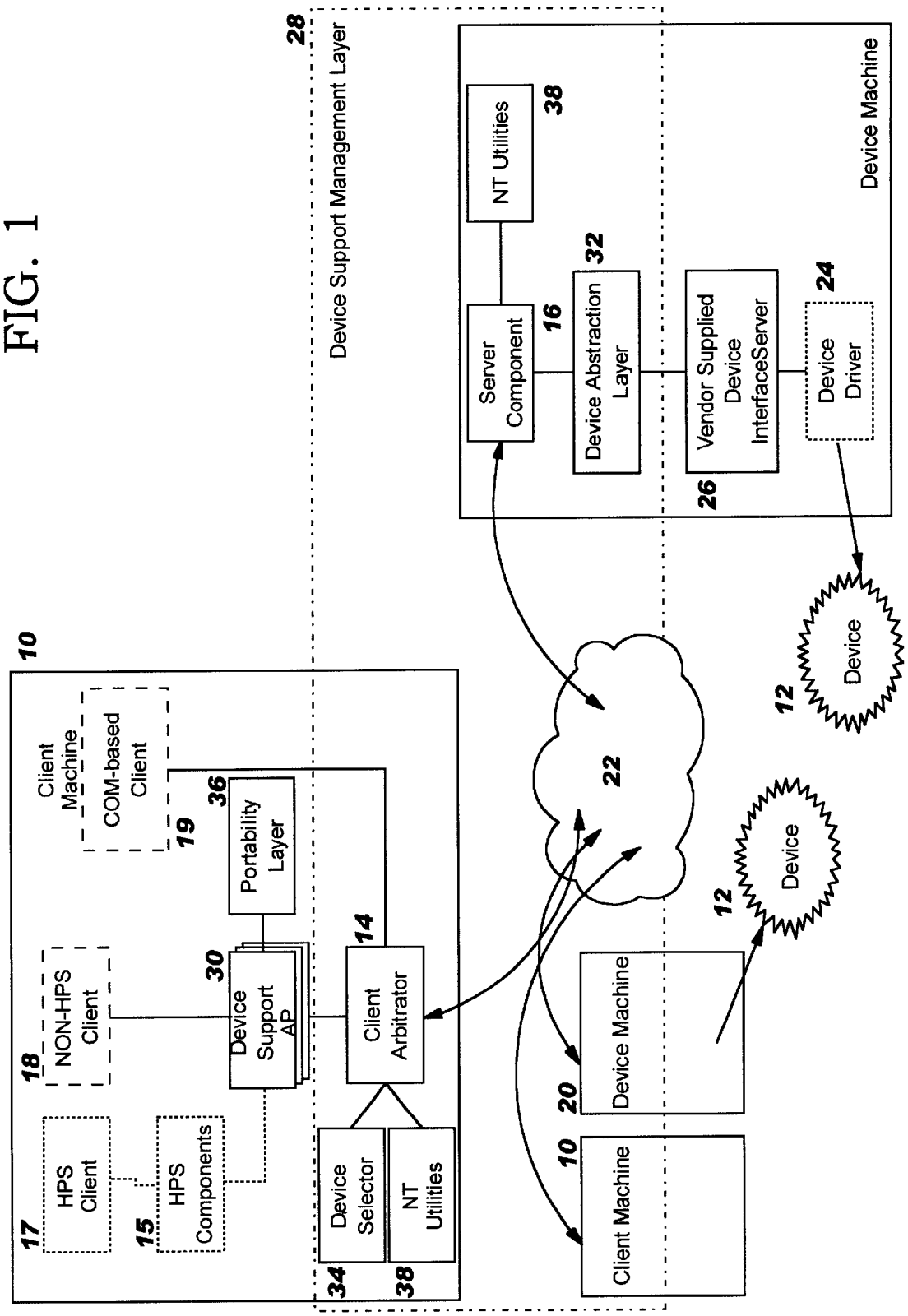
FIG. 1 is a schematic diagram of a network in which client machines access devices connected to device machines.

In the present embodiment, three layers of software are used for supporting devices. A Device Driver 24 and an Interface Layer 26 run in a device machine 20, and a Device Support Manager Layer 28 runs in both the device 20 and a client machine 10. In the present embodiment the Device Support Management Layer 28 is a DCOM-based solution. The invention is, however, not limited to COM, it can work with both with COM and non-COM client applications.

Device Drivers 24 are the standard software shipped with devices. Examples of devices used in a banking environment are: a Card Reader or Magnetic Stripe Reader which is the most usual banking equipment for reading magnetic cards, and reads track 2 of different bank cards; a Document Reader which reads cheques and other Financial Institution documents; and a Passbook printer which prints passbooks and receipts and read/writes magnetic stripes on passbooks (it works mostly like a simple printer with an integrated card reader). It will be seen that these devices are described for exemplary purposes only, and the invention is not limited to such devices.

The interface layer 26 includes Vendor Supplied Device Interfaces (VSDI) in the form of dynamic link libraries (DLL). A VSDI acts as a wrapper for the actual device driver enabling the Device Support Layer 28 to connect to the standard device drivers. While the Device Support Layer 28 is preferably Windows Open System Architecture (WOSA) compliant, it can also work with non-WOSA compliant VSDI. A device abstraction layer 32 is provided within the support layer 28 to ensure that the correct DLL 26 is loaded for a vendor's device.

Clients access device support functionality through respective Device Support APIs 30. In the present embodiment, each Device Support API, provides a C interface between Seer*HPS (High Productivity System) processes, based on components 15 produced by Seer Technologies, as well as non-HPS-based processes, and the device support layer 28.

Other components of the system are a Device Selector 34 which allows for addition, configuration and access of devices by a client arbitrator 14; a Portability Layer 36 which provides the basic functions on the platform, such as Inter-process communication (IPC), message handling, shared memory, alert handling and log handling; and NT Utilities 38 which are a collection of utility functions to manage the Windows registry and messages.

At the core of each client is a client arbitrator 14 which synchronizes client access to devices via a server component 16 across the network. The client arbitrator 14 can be accessed from several client processes (applications) 17–19 and it can utilize several server components 16 to access devices. The server component 16 can in turn be accessed from several clients (client arbitrators) and calls upon one or more device abstraction layers 32 to talk to the devices.

It will be seen that while a client arbitrator can be located on the same machine as the server component, there will be only one client arbitrator per machine as, in the present embodiment, it is the client arbitrator that determines whether or not a client machine can retain access to a device.

Figure 2:
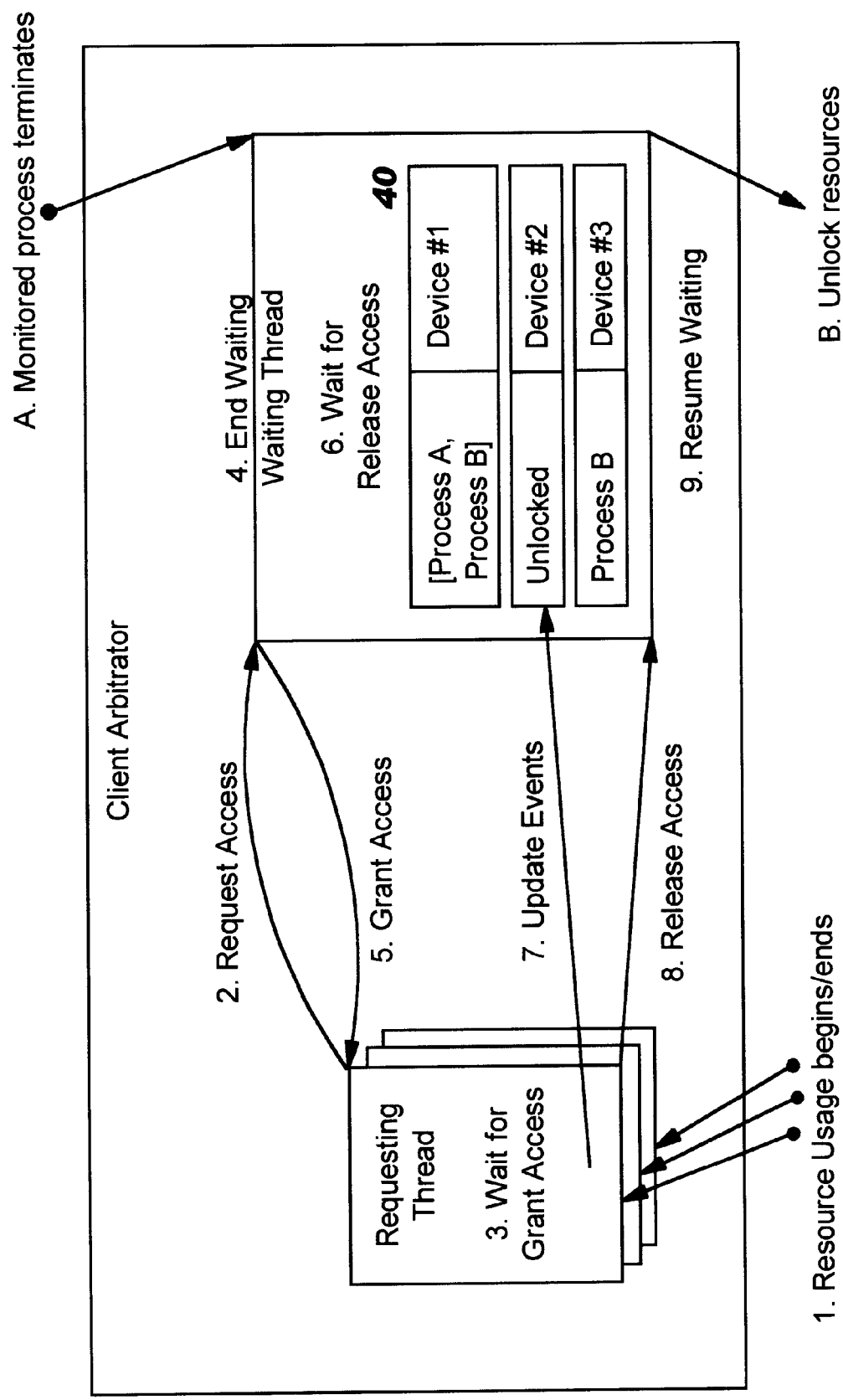
FIG. 2 is a block diagram illustrating the operation of a client arbitrator within the network of FIG. 1.

The invention provides a synchronisation mechanism within the client arbitrator which is used to monitor and control client access to devices. Referring now to FIG. 2, the client arbitrator includes two types of thread which are used to implement the invention.

A requesting thread is spawned each time a client process 17–19, through one of the device support API's 30, issues a device request. If no other client machine has locked the device, then the client arbitrator 14 will cause the server component 16 to lock the device. Similarly, when the client arbitrator receives a message for the device support API 30 that a process wishes to release a device, a requesting thread is spawned. In this way a requesting thread knows whenever a process to be monitored, in this case Process A or B, begins or ceases to use a device.

The client arbitrator also includes a single waiting thread which monitors processes, in the case of FIG. 2 Processes A and B, to determine when they terminate, i.e. listening for a process termination event. The waiting thread also waits for a Request Access event.

In order to change the list of monitored processes, the waiting thread needs to be taken from a waiting state to have its list of process termination events to which it listens changed. When a requesting thread is spawned by a request from a process to either access or release a device, step 1, it generates a Request Access event, step 2. Only one requesting thread may have access to the waiting thread at a time, and so if more than one requesting thread is spawned simultaneously, they each have to wait their turn until the others have completed their access to the waiting thread.

Thus, a requesting thread waits for a Grant Access event to be generated by the waiting thread, step 3. On receipt of the Request Access event, the waiting thread stops waiting, step 4, and replies by generating the Grant Access event— for which only the requesting thread which was granted access will be listening, step 5. The waiting thread then waits for a Release Access event to be generated by the requesting thread which was granted access, step 6. In the meantime, the requesting thread can add or remove the identity of the calling process from a data structure 40 containing lists of processes which are accessing a device according to whether the requesting process is requesting or releasing access to the device, step 7.

If a process is the last to release access to a device, then the client arbitrator can instruct the server component that it wishes to release the device for access by other clients. Correspondingly, if a process releases its last device, the client arbitrator can decide to no longer monitor for its process terminate event, as this will have no effect on the release of devices.

It should be noted that in the case of devices such as a card reader or a document reader, simultaneous access by more than one process from the same client machine is permitted. (It will be noted that once a client machine locks a device, processes from other client machines may not access the device.) The passbook printer, however, may only be accessed by one process at a time.

Once the updating of the data structure 40 is complete, the requesting thread generates a Release Access event, step 8. The waiting thread now resumes waiting for termination events for each process in the data structure 40 accessing a device or for a subsequent Request Access from a requesting thread, step 9.

If a monitored process terminates, it generates a process terminate event, step A. The waiting thread which is listening for such an event, checks the data structure 40 to see which devices are locked by the terminated process and the process identity is removed from the list of processes accessing any such device.

If other processes remain in a device access list, then the client machine can continue to lock the device. Thus, in the example of FIG. 2, if Process B terminates, Process A would wish to retain access to device #1. If no processes remain, as in the case of device #3 when Process B terminates, then the client arbitrator can instruct the server component 16 associated with this device that it wishes to release the device, thus allowing other client machines immediate access to the device, step B.

Thus, steps 1 to 9 described above ensure atomic access by requesting threads to the data structure 40 containing events to be waited for.

It will be seen that between steps 4 and 9, the waiting thread will not be listening for process termination events. However, in for example Windows NT when such an event is generated, the event remains signaled until a process closes the event. Thus, so long as no other thread within the client arbitrator process closes this event during this period, the event should remain signaled until the waiting thread resumes waiting. At this point the waiting thread will detect the process termination event and act as before.

The invention solves two problems of the prior art in that if a device is locked by only one process which abnormally terminates, the device can be released immediately, whereas if another process within the client wishes to retain access to a device, it will not be unexpectedly disconnected from a device to which it should legitimately retain access.

What is claimed is:

1. A client arbitrator operable in a multi-processing operating system for monitoring and controlling a client machine's access to one or more devices, said arbitrator including:

request monitoring means, responsive to a process request to begin or to cease accessing a device, for updating a list of monitored processes accordingly; and waiting means, responsive to termination of a monitored process, for determining any locked devices to which said process has access, and, responsive to no other monitored process having access to any of said locked devices, for releasing said client machine's access to said devices.

2. A client arbitrator as claimed in claim 1 wherein said waiting means is responsive to a monitored process ceasing access to a device and to no other monitored process having access to said locked device, for releasing said client machine's access to said device.

3. A client arbitrator as claimed in claim 1 wherein said waiting means is responsive to a monitored process ceasing access to a device and to said monitored process having access to no other device, for ceasing to monitor for termination of said process.

4. A client arbitrator as claimed in claim 1 wherein said operating system is a multi-threaded operating system and said arbitrator is responsive to each process request to instantiate an associated request monitoring means as a thread.

5. A client arbitrator as claimed in claim 4 wherein said waiting means is instantiated by said arbitrator as a thread containing said list of monitored processes.

6. A client arbitrator as claimed in claim 5 wherein said list of monitored processes comprises a list of devices, each device having an associated list of processes accessing said device.

7. A client arbitrator as claimed in claim 5 wherein each instantiation of said request monitoring means is adapted to receive exclusive access to said instantiation of said waiting means before updating said list of monitored processes.

8. A client arbitrator as claimed in claim 7 wherein each request monitoring instantiation is adapted to wait for a response from said waiting instantiation to an access request before accessing said list of monitored processes.

9. A client arbitrator as claimed in claim 8 wherein said waiting instantiation is adapted to stop waiting for termination of a monitored process once it has granted an access request to a request monitoring instantiation and is adapted to wait for an access release request from said request monitoring instantiation before resuming waiting for termination of a monitored process.

10. A computer program product comprising computer program code stored on a computer readable storage medium for, when executed on a computer, monitoring and controlling said computer's access to one or more devices, the program code comprising:

computer readable means for request monitoring, responsive to a process request to begin or to cease accessing a device, for updating a list of monitored Drocesses accordingly; and computer readable means for waiting, responsive to termination of a monitored Process, for determining any locked devices to which said process has access, and, responsive to no other monitored process having access to any of said locked devices, for releasing said client machine's access to said devices.

11. A method operable in a client arbitrator for a multi-processing operating system for monitoring and controlling a client machine's access to one or more devices, said method comprising the steps of:

responsive to a process request to begin or to cease accessing a device, updating a list of monitored processes accordingly;

responsive to termination of a monitored process, determining any locked devices to which said process has access; and responsive to no other monitored process having access to any of said locked devices, releasing said client machine's access to said devices.

12. A client arbitrator operable in a multi-threaded, multi-processing operating system for monitoring and controlling a client machine's access to one or more devices, said arbitrator including:

request monitoring means, responsive to a process request to begin or to cease accessing a device, for updating a list of monitored processes accordingly, and responsive to each process request to instantiate an associated request monitoring means as a thread; and waiting means, instantiated by said arbitrator as a thread containing said list of monitored processes and responsive to termination of a monitored process, for determining any locked devices to which said process has access, and, responsive to no other monitored process having access to any of said locked devices, for releasing said client machine's access to said devices, wherein each instantiation of said request monitoring means is adapted to receive exclusive access to said instantiation of said waiting means before updating said list of monitored processes.

13. A client arbitrator as claimed in claim 12 wherein each request monitoring instantiation is adapted to wait for a response from said waiting instantiation to an access request before accessing said list of monitored processes.

14. A client arbitrator as claimed in claim 13 wherein said waiting instantiation is adapted to stop waiting for termination of a monitored process once it has granted an access request to a request monitoring instantiation and is adapted to wait for an access release request from said request monitoring instantiation before resuming waiting for termination of a monitored process.

* * * * *